US009504954B2

(12) United States Patent
Rolf et al.

(10) Patent No.: US 9,504,954 B2
(45) Date of Patent: Nov. 29, 2016

(54) FILTRATION DEVICE AND METHOD

(71) Applicants: Timothy Wilder Rolf, Washington, DC (US); Howard Martin Britton, Upper Marlboro, MD (US)

(72) Inventors: Timothy Wilder Rolf, Washington, DC (US); Howard Martin Britton, Upper Marlboro, MD (US)

( * ) Notice: Subject to any disclaimer, the term of this patent is extended or adjusted under 35 U.S.C. 154(b) by 327 days.

(21) Appl. No.: 14/102,420

(22) Filed: Dec. 10, 2013

(65) Prior Publication Data

US 2015/0157973 A1 Jun. 11, 2015

(51) Int. Cl.
*B01D 53/06* (2006.01)
*B01D 46/00* (2006.01)
*B01D 46/30* (2006.01)

(52) U.S. Cl.
CPC ........... *B01D 53/06* (2013.01); *B01D 46/0036* (2013.01); *B01D 46/30* (2013.01); *B01D 2253/1124* (2013.01); *B01D 2253/304* (2013.01); *B01D 2253/306* (2013.01); *B01D 2257/60* (2013.01)

(58) Field of Classification Search
CPC .. B01D 24/32; B01D 24/36; B01D 24/4631; B01D 46/30; B01D 46/32; B01D 46/36; B01D 46/38; B01D 53/02; B01D 53/06; B01D 53/08; B01D 53/10; B01D 53/12; B01D 53/261; B01D 2253/1124; B01D 2253/304; B01D 2253/306; B01D 2253/308; B01D 2257/60; B01J 20/0225; B01J 20/0229; B01J 20/06; B01J 20/28004; B01J 20/28009; B01J 20/28061; B01J 20/2808; B01J 20/28083; B01J 20/2809; B01J 20/345; B01J 20/3458; B01J 20/3491; B01J 2220/56; B01J 2220/66

See application file for complete search history.

(56) References Cited

U.S. PATENT DOCUMENTS

| | | | | |
|---|---|---|---|---|
| 4,140,502 A | * | 2/1979 | Margraf | B01D 46/0075 261/81 |
| 4,203,737 A | * | 5/1980 | Margraf | B01D 46/48 55/283 |
| 4,353,720 A | * | 10/1982 | Margraf | B01J 8/18 422/171 |
| 4,415,342 A | * | 11/1983 | Foss | B01D 46/10 423/245.1 |

* cited by examiner

*Primary Examiner* — David C Mellon
(74) *Attorney, Agent, or Firm* — Maxvalueip LLC

(57) ABSTRACT

In one example, we describe a method and system that uses iron oxide as its sole sorbent, specifically micron-sized nano-porous iron oxide particles. The sorbent is housed inside a horizontally rotating sorbent bed. The horizontally rotating sorbent bed is housed inside of a larger secondary compartment. At the top of the secondary compartment, there is an escaped sorbent particle containment membrane. One example uses a self-cleaning horizontally rotating sorbent drum membrane design that unclogs particulates lodged in the membrane by reversing particulate air flow direction during a small portion (e.g., about 20 degrees) of each full 360 degree rotation of the drum. When air flow passes through the porous horizontally rotating sorbent drum's membrane, which occurs at the location where the rotating sorbent bed membrane comes into contact with the air feed manifold, particulates are air-dislodged from the inner facing surface of the drum's membrane. Other variations are discussed.

19 Claims, 8 Drawing Sheets

FILTRATION DEVICE AND METHOD

BACKGROUND OF THE INVENTION

Figure 1:
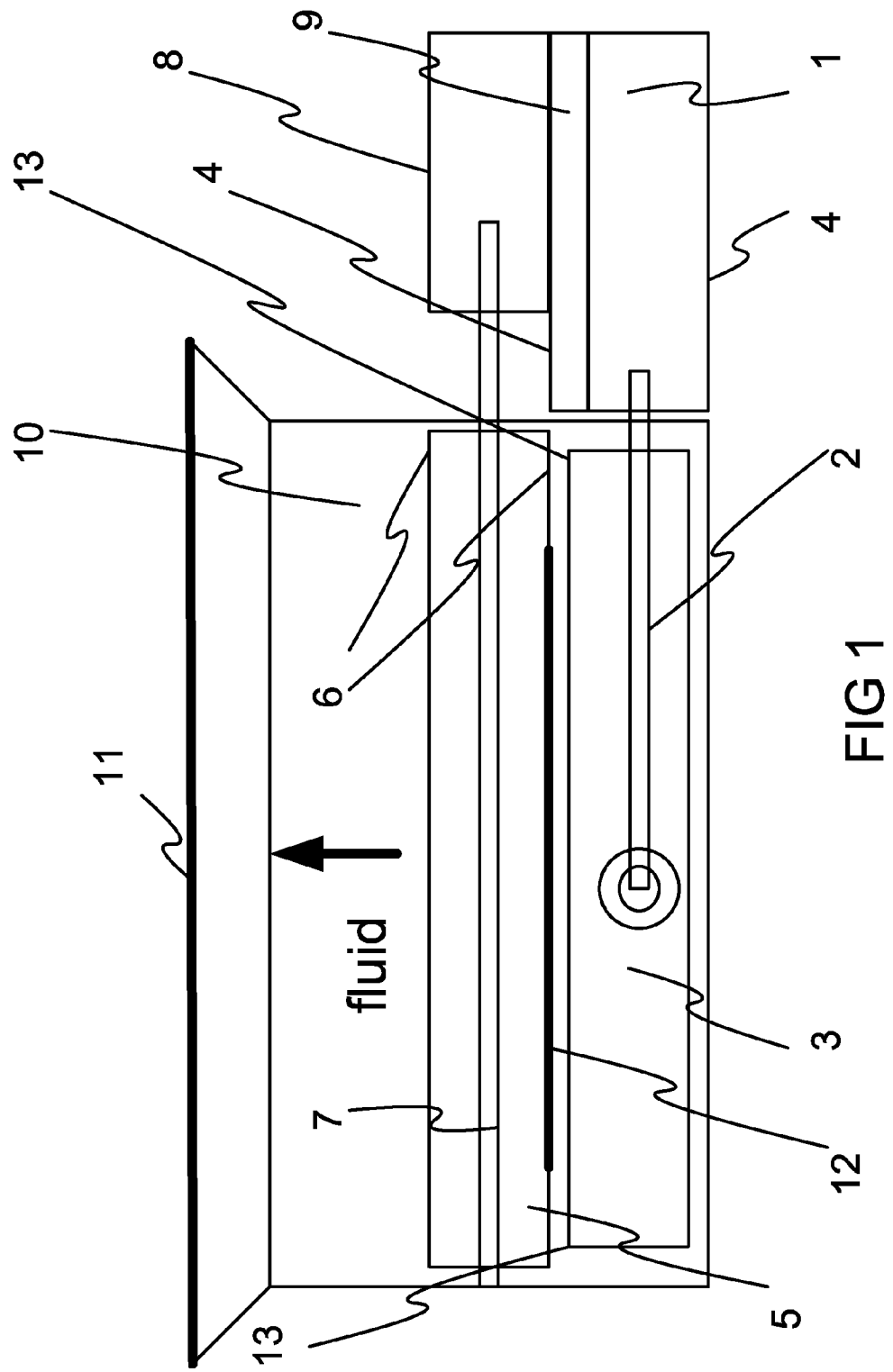

The filtering for fluid, including liquid and gas, is extremely important for multiple reasons, including, e.g., for recycling, environmental cleaning, toxic removal, drinking water, allergy reduction, gathering precious material, filtering specific material, semiconductor processing and production, purification, medical reasons, medical supplies, laboratory work, experimental parameter control, and standardization. One aspect of filtering is removal of particles or substances from the fluid, such as from air.

Air filters are used to remove impurities from air. Such air filters typically include a removable and replaceable main filter cartridge positioned therein. The main filter cartridge can be connected to a secondary filter, and multiple filters thereafter. Filter cartridges are typically serviced by being removed or replaced.

Some of the prior work is described in the following US and foreign patents/applications:

| | |
|---|---|
| 6,358,871 | Sircar |
| 6,923,841 | Chen |
| 20050126428 | Lee, et al. |
| 7,141,518 | MacDonald, et al. |
| 20090252654 | Hsu, et al. |
| 20100233245 | Narayana |
| 20110036778 | Willuweit |
| JP 1998173766 | Ohtake, et al. |
| JP 10130072 | Miyao |
| JP 11019431 | Iimura, et al. |
| JP 2000157811 | Yamamoto |
| JP 2002331212 | Ogawa |
| CN 101020133 | Sun, et al. |
| JP 4212927 | Miwa, et al. |
| WO 2009059457 | Chen, et al. |
| TW 337632 | Chen, et al. |
| JP 4692311 | Ueda |
| DE 102010005114 | Scope, et al. |

An example of journal publication is: CAI, et al., "Effect of molar ratio of MgO/Al2O3 on the performance of MgO—Al2O3-Fe2O3 composite," Advanced Materials Research, Pt. 1, Materials and Design, pp. 242-245, 2011.

However, the invention and embodiments described here, below, have not been addressed or presented in any prior art. For example, one embodiment teaches a filter apparatus, specifically a filter apparatus for air filtration of airborne particulates, using a sorbent.

For some of the prior art, iron oxide is one of the multiple compounds listed that collectively comprise the sorbent. However, iron oxide alone has not been used as the single or sole compound for sorbent. For example, for JP 2000157811, ceramic is impregnated or otherwise combined with iron oxide. Ceramic and iron oxide together comprise the sorbent. For JP 4212927, iron oxide is a catalyst for particulate removal from diesel engine exhaust.

In one embodiment of our invention, a sorbent air filtration device is disclosed. The sorbent is comprised solely and exclusively of iron oxide, specifically micron-sized nanoporous iron oxide particles.

SUMMARY OF THE INVENTION

In one embodiment, we describe a method that uses iron oxide as its sole sorbent, specifically micron-sized nanoporous iron oxide particles. The sorbent is housed inside a horizontally rotating sorbent bed. The horizontally rotating sorbent bed is housed inside of a larger secondary compartment. At the top of the secondary compartment, there is an escaped sorbent particle containment membrane.

Figure 8:
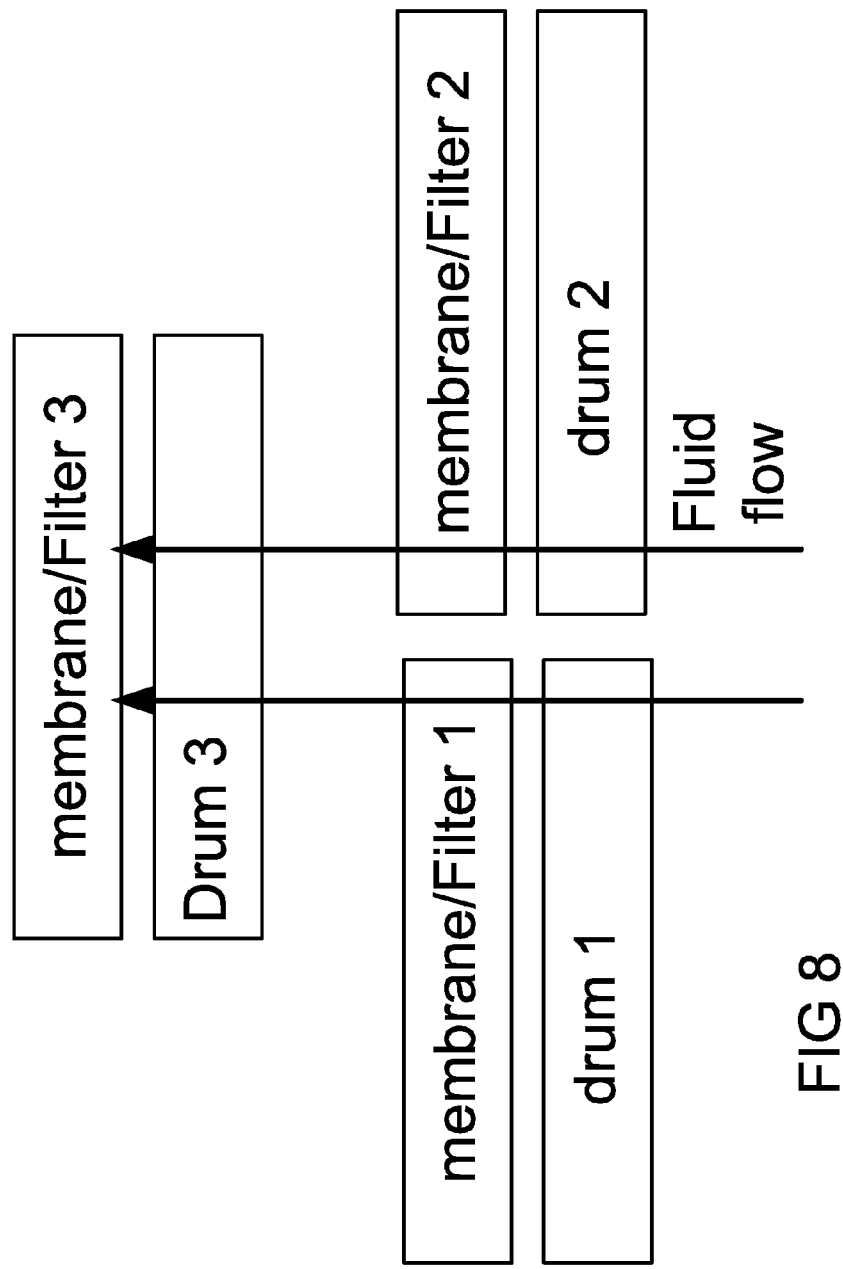

The mechanism of filtration in a horizontally rotating sorbent bed is different from vertically rotating cyclonic air filters. A horizontally rotating sorbent bed uses horizontal rotation to uniformly disburse sorbent particles in the air flow, so to prevent particulate agglomeration or clustering or clogging that reduces sorbent capacity and operational life. Therefore, a horizontally rotating sorbent bed is a particle dispersion mechanism. In contrast, a vertically rotating cyclonic air filter uses vertical rotation to centrifugally segregate particulates from air. Therefore, a vertically rotating cyclonic air filter is a particle segregation mechanism.

Typical air filter membranes are subject to membrane clogging, also known as membrane fouling, which occurs when particulates become lodged in and obstruct membrane apertures. Membrane particulate clogging impedes air filter performance by reducing the volume of remaining functional membrane surface area available for particle filtration.

One embodiment of this invention uses a self-cleaning membrane design that unclogs particulates lodged in the membrane by reversing particulate air flow direction during a small portion (about 20 degrees, as an example) of each full 360 degree rotation of the sorbent bed. When air flow passes through the rotating sorbent bed membrane, which occurs at the location where the rotating sorbent bed membrane comes into contact with the air feed manifold, particulates are air-dislodged from the inner facing surface of the membrane. During the remainder of the cycle, air flow pushes particulates up against the inner facing surface membrane, which causes particulate lodging. Particulate lodging only occurs when the size of the particulate coming into contact with membrane is exactly or near the same size as the membrane's aperture.

Particulates larger than the membrane's aperture remain contained inside the rotating sorbent bed. Particulates smaller than the membrane's aperture escape through the rotating sorbent bed membrane and travel upwards inside the larger secondary compartment. Located at the top of the secondary compartment is an escaped sorbent particle containment membrane. The surface area of the escaped sorbent particle containment membrane is larger than the 2-dimensional surface area at the bottom of the secondary compartment, to reduce backpressure and air flow speed. The secondary sorbent can be alumina, zeolites, sulfur, activated carbon, or any combination thereof, depending on the type of particles targeted for remediation or filtering purpose.

BRIEF DESCRIPTION OF THE DRAWINGS

FIG. 1 is for one embodiment, as an example, for the whole apparatus.

FIG. 2 is for one embodiment, as an example, for the cross section of the horizontally rotating sorbent drum.

FIG. 3 is for one embodiment, as an example, for the cross section of the horizontally rotating sorbent drum.

FIG. 4 is for one embodiment, as an example, for the cross section of the horizontally rotating sorbent drum.

FIG. 5 is for one embodiment, as an example, for the cross section of the horizontally rotating sorbent drum.

FIG. 6 is for one embodiment, as an example, for series configuration of horizontally rotating sorbent drums and filters or membranes.

FIG. 7 is for one embodiment, as an example, for parallel configuration of horizontally rotating sorbent drums and filters or membranes.

FIG. 8 is for one embodiment, as an example, for series/parallel mixed configurations of horizontally rotating sorbent drums and filters or membranes.

DETAILED DESCRIPTION OF THE PREFERRED EMBODIMENTS

In one embodiment of the invention, air enters the filter through a pump [1]. The pump pushes air through an air feed hose [2] into an air reservoir compartment [3]. The air reservoir compartment is the internal area of a protective housing shell [4] that is located directly below a horizontally rotating sorbent drum [5].

In one embodiment of the invention, the horizontally rotating sorbent drum's outer layer is a porous membrane comprised of wire cloth [6]. The horizontally rotating sorbent drum's inner cavity contains sorbent particles. The horizontally rotating sorbent drum rotates on a spindle [7] that is connected to a motor [8]. A motor brace [9] anchors the motor to the top of the protective housing shell. Also attached to the top of the protective housing shell, directly above the air reservoir compartment, is a secondary compartment [10]. At the top of the secondary compartment is a secondary membrane filter [11].

In one embodiment of the invention, air pumped inside the air reservoir compartment exits the air reservoir compartment through a narrow rectangular slot located at the top center of the air reservoir compartment. The narrow rectangular slot's length [12] is approximately 98% the length of the horizontally rotating sorbent drum, as an example, for uniform air dispersion. Two grooves [13], one on each end of the horizontally rotating sorbent drum, upon which the drum rests upon when rotating, comprise the remaining, approximate 2%, of the narrow rectangular slot's length (See FIG. 1).

In one embodiment of the invention, the region of the protective housing shell located directly to the left and right of the narrow rectangular slot, upon which the horizontally rotating sorbent drum rests, is concave shaped [14] to minimize air flow leakage and rotational resistance.

Figure 2:
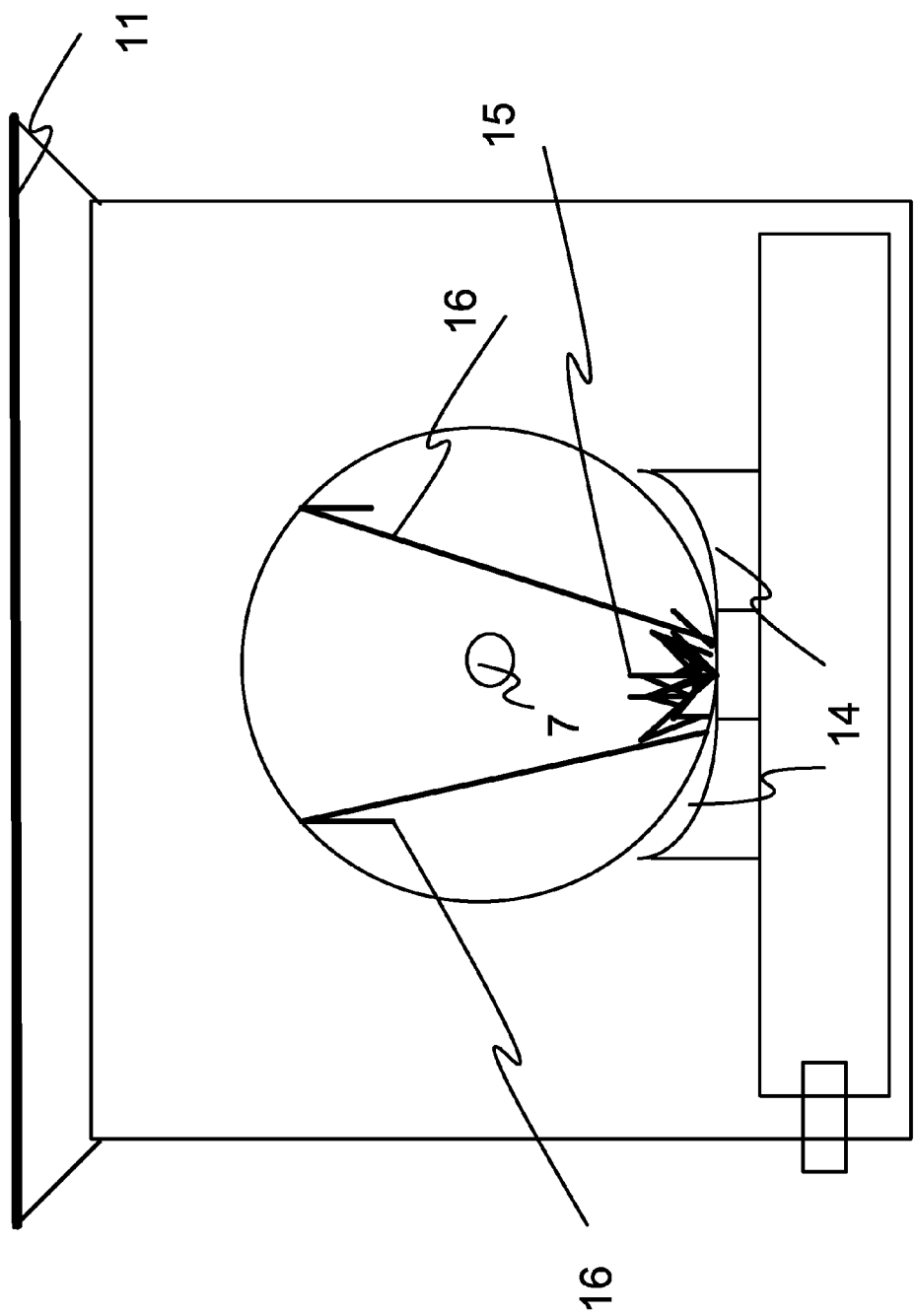
Figure 3:
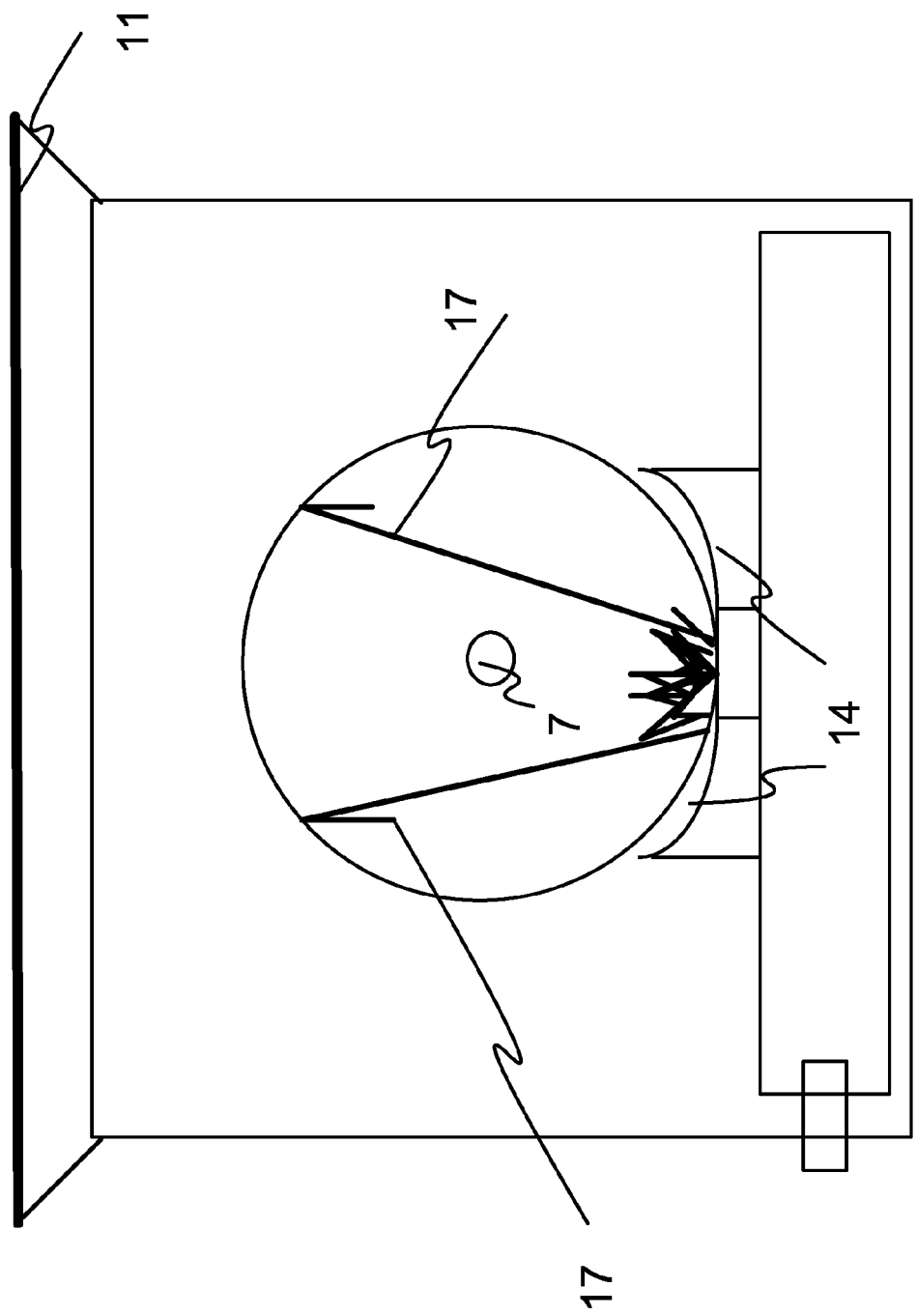
Figure 4:
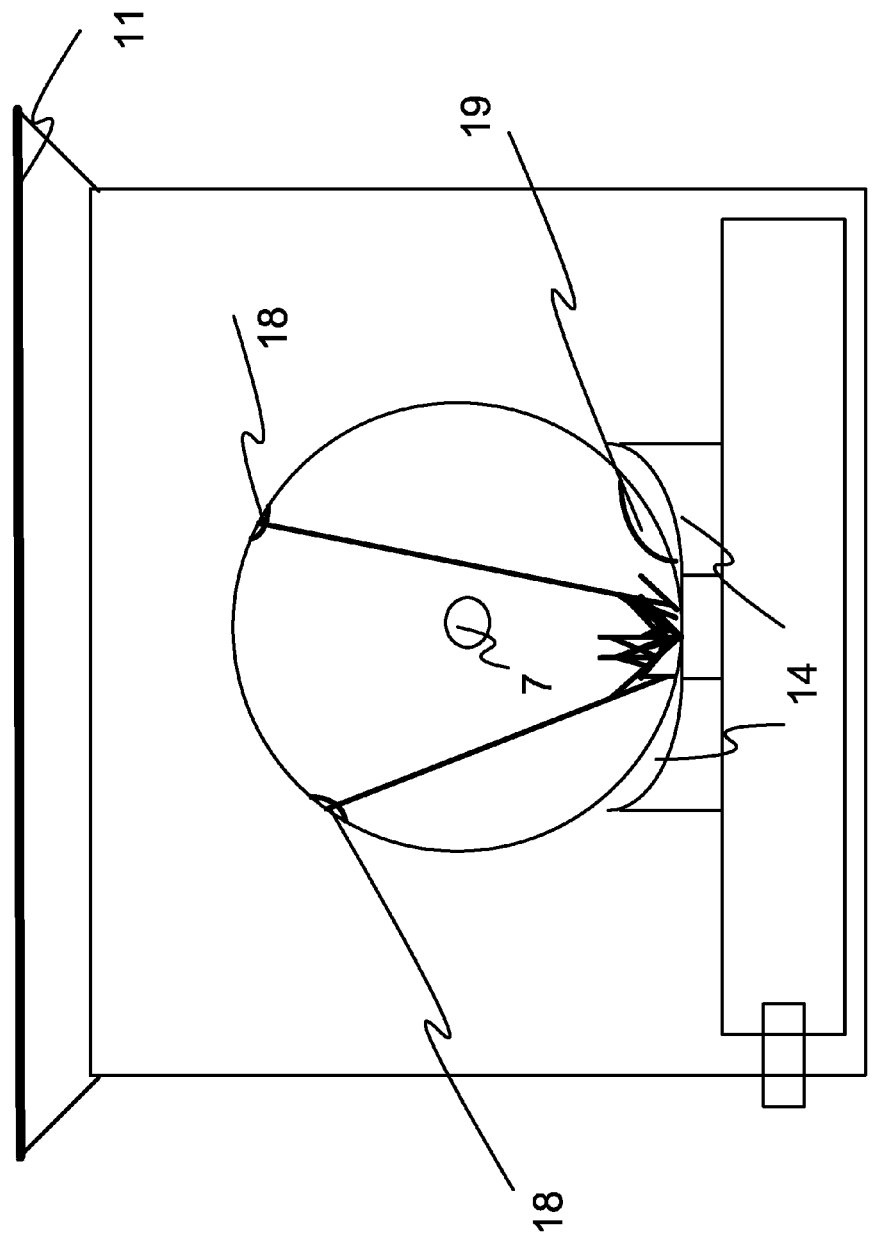
Figure 5:
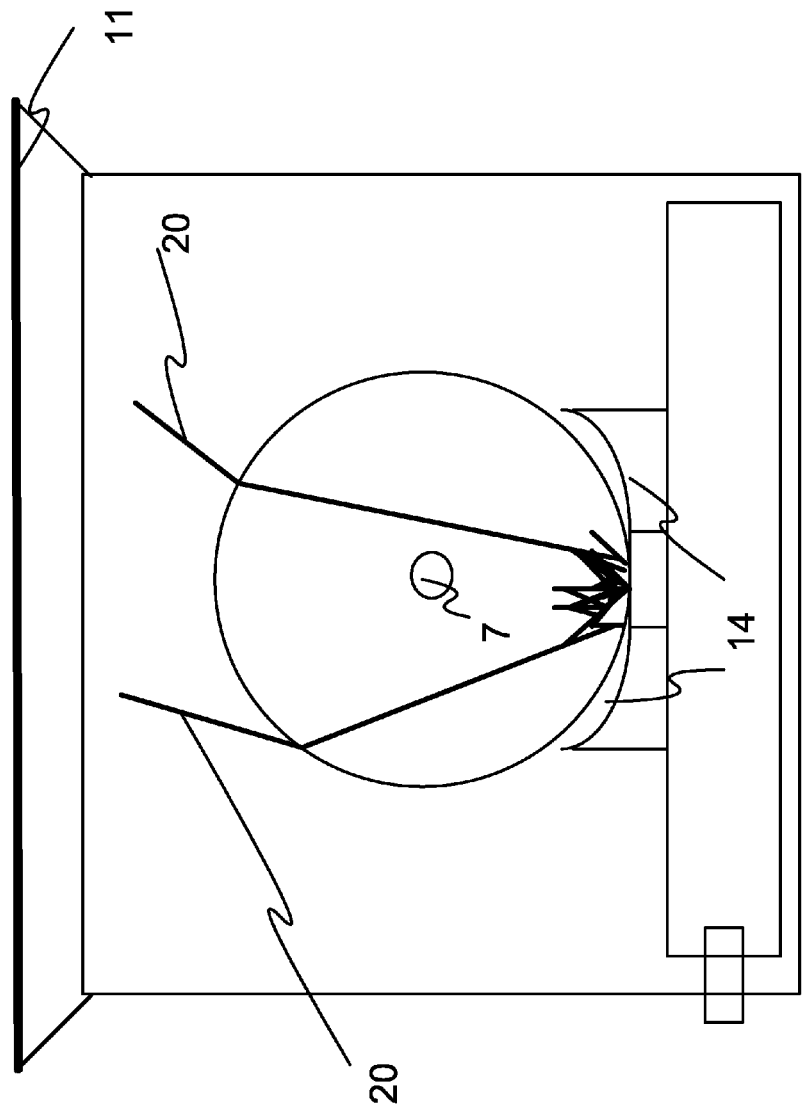

In one embodiment of the invention, as the upward traveling air exits the air reservoir compartment and passes through the horizontally rotating sorbent drum's porous wire cloth membrane, air comes into contact with sorbent particles that have accumulated at the bottom of the horizontally rotating sorbent drum. The air flow separates accumulated sorbent particles resting at the bottom of the horizontally rotating sorbent drum [15] and pushes the particles upwards [16] inside of the horizontally rotating sorbent drum's inner cavity. As sorbent particles are pushed higher inside the rotating sorbent drum's inner cavity, particulate agglomerations become smaller and smaller (See FIG. 2).

In one embodiment of the invention, this separation process causes sorbent particles, as they travel upward and outward, to continuously rotate and reorient their position inside the horizontally rotating sorbent drum, which in turn exposes particle surface areas, previously unexposed to contaminants in an air flow, to become exposed to and capture contaminants, whereby increasing sorbent capacity and life cycle, as well as increasing effective cross section area or outer surface area exposed to contaminants, to capture more contaminants, faster and more efficiently, with less cost of maintenance, repair, cleaning, supplies, and down-time, reducing the overall cost of equipment for installation and maintenance.

In one embodiment of the invention, for sorbent particles larger than 10 microns, as an example of the threshold and size for the drum parameter and dimension, when they come into contact with drum membrane's inner facing wall, they lose their velocity and fall back to the bottom of the drum [17] (See FIG. 3).

In one embodiment of the invention, sorbent particles equal to or near 10 microns become lodged in drum membrane's inner facing wall [18], and are later dislodged from membrane [19], as previously described (See FIG. 4).

In one embodiment of the invention, sorbent particles smaller than 10 microns escape through drum membrane [20], as previously described (See FIG. 5).

In one embodiment of the invention, the membrane of the horizontally rotating sorbent bed is wire cloth, sintered metal, or similar porous metal. The sorbent bed rotates on a spindle or spin device that is connected to a motor, directly or through a gear box or gear or belt or chain or shaft. A motor brace anchors the motor to a base plate.

In one embodiment of the invention, the air feed manifold reconfigures the air flow, from a cylindrical shape equal to the inner diameter of the pump's air output hose to a thin rectangle shape equal to the horizontal length of the rotating sorbent bed, for uniform air flow dispersion.

In one embodiment of the invention, flexible blades create a flexible barrier between the air feed manifold and the horizontally rotating sorbent bed, and are angled at approximately 10 degrees, as an example, in the same direction as sorbent bed's rotation, so that air travels directly from the manifold to the rotating sorbent bed's outer facing membrane with (a) little to no air flow leakage, and (b) minimal resistance to the sorbent bed's rotation. In one embodiment of the invention, the air flow that passes through the rotating sorbent bed's membrane enters the internal cavity of the sorbent bed at the bottom of the horizontally rotating sorbent bed.

In one embodiment of the invention, as the upward traveling air flow comes into contact with sorbent particles that have been accumulated at the bottom of the rotating sorbent bed, accumulated sorbent particles separate from the bottom mass and are pushed upwards. As sorbent particles are pushed higher, inside the rotating sorbent bed's inner cavity, particulate agglomerations or accumulations become smaller and smaller, for more efficient filtering and less clogging effect. This increases sorbent capacity and life cycle. This increases efficiency and filtering output, reducing the price and cost for the process and device, as well as reducing the maintenance frequency and cost.

In one embodiment of the invention, the horizontally rotating sorbent bed itself is housed inside of a larger secondary sealed compartment (see FIG. 1). Air flow containing sorbent particles smaller than 10 microns travel upwards in the compartment until they reach an escaped sorbent particle containment membrane [11], located at the top of the compartment. The secondary filter contains a secondary membrane, filter, and/or sorbent bed component that captures particles less than 10 microns (as an example) in the airstream that escaped through the primary rotating sorbent bed. The surface area of the escaped sorbent particle containment membrane [11] is larger than the 2-dimensional surface area at the bottom of the secondary compartment, slowing particulate and air flow velocity (as shown in FIG. 1).

Here are some examples for our inventions, with the specific obtained results:

Example 1

An air flow containing multi-element particles was introduced into a horizontally rotating sorbent bed comprising a nano-porous iron oxide sorbent. An ICP/MS analysis confirmed that the nano-porous iron oxide sorbent filtered all particles which comprised sodium, magnesium, phosphorus, potassium, manganese, cobalt, nickel, copper, zinc, and gold.

Example 2

An air flow containing multi-element particles was introduced into a horizontally rotating sorbent bed comprising a nano-porous iron oxide sorbent. An ICP/MS analysis confirmed that the nano-porous iron oxide sorbent filtered particles which comprised sodium, magnesium, aluminum, potassium, calcium, titanium, manganese, cobalt, nickel, copper, and lead.

Example 3

An air flow containing multi-element particles was introduced into a horizontally rotating sorbent bed comprising a nano-porous iron oxide sorbent. An ICP/MS analysis confirmed that the nano-porous iron oxide sorbent filtered particles which comprised sodium, magnesium, aluminum, potassium, calcium, titanium, manganese, cobalt, nickel, copper, zinc, and gold.

Example 4

An air flow containing particles was introduced into a horizontally rotating sorbent bed comprising a nano-porous iron oxide sorbent. A dual element ICP/MS analysis confirmed that the nano-porous iron oxide sorbent filtered particles of arsenic and lead.

Example 5

An air flow containing particles was introduced into a horizontally rotating sorbent bed comprising a nano-porous iron oxide sorbent. A single element ICP/MS analysis confirmed that the nano-porous iron oxide sorbent filtered particles of silver.

In various embodiments, we have the following variations and situations:

A device comprising an air filter that uses iron oxide as device's sole sorbent, housed in a horizontally rotating sorbent bed.
The iron oxide sorbent is nano-porous.
The iron oxide particle size ranges from 5 to 90 microns.
The mean iron oxide particle size is 21 microns.
The average iron oxide particle size is 21 microns.
The standard deviation for iron oxide particle size is 2 microns.
The standard deviation for iron oxide particle size is 5 microns.
The standard deviation for iron oxide particle size is 10 microns.
The standard deviation for iron oxide particle size is 20 microns.
The iron oxide particle size surface area ranges from 50 to 400 m$^2$/gram.
The iron oxide particle size surface area ranges from 230 to 260 m$^2$/gram.
The iron oxide pore size ranges from 10 to 90 angstroms.
The iron oxide pore size is 41 angstroms.
The iron oxide compound is unhydrated.
The iron oxide compound is hydrated.
The horizontally rotating sorbent bed's outer perimeter is composed of a membrane.
For the membrane, the aperture size ranges from 1 to 30 microns.
For the membrane, the aperture size is 10 microns.
The membrane fabric is polymeric.
The membrane fabric is nylon.
The membrane fabric is wire cloth.
The membrane is composed of sintered metal.
The horizontally rotating sorbent bed is housed inside a larger secondary compartment.
Located at the top of the secondary compartment is an escaped sorbent particle containment membrane.
The escaped sorbent particle containment membrane is a polymeric membrane with an aperture of 1 to 10 microns.
The escaped sorbent particle containment membrane is a nylon membrane with an aperture of 1 to 10 microns.
The escaped sorbent particle containment membrane is a wire cloth membrane with an aperture of 1 to 10 microns.
The escaped sorbent particle containment membrane has a horizontal surface area larger than the 2-dimensional horizontal surface area at bottom of secondary compartment, where rotating sorbent bed is located.
Located above the secondary compartment membrane is one or more additional membranes, filters, and/or other sorbents, including, e.g., alumina, zeolites, sulfur, and/or activated carbon.
A process of using an iron oxide sorbent, contained inside a horizontally rotating drum, to filter air or fluid or gas or water or liquid.
A process wherein metal and inorganic particles are removed from the air or fluid or gas or water or liquid.

Appendices are added, with figures, as separate files, for better descriptions and more variations. For example, Appendices 1-5 (labeled "App1to5") correspond to FIGS. 1-5, respectively. Appendices 6-10 (labeled "App6to10") correspond to FIGS. 1-5, respectively. Appendices 11-14 (labeled "App11to14") correspond to an actual prototype of device shown in FIG. 1, shown from different directions/views/angles, from 4 directions, to show the details in 3D images/photos.

In one embodiment of the invention, we have a rotating drum or cylinder, with self-cleaning process, to agitate the particles in each rotation, to remove them from clogging on a corner on the drum, using both rotation of the drum and also air pressure from bottom, i.e., angular momentum exerted from the drum and linear momentum exerted from air or fluid coming in from the bottom. In one embodiment of the invention, the whole assembly can be shaken from the base or table, with a small motor or step motor, on a clock cycle, to slightly move the table left-right directions or up-down positions, just a little bit, to disengage the particles, as a way of self-cleaning, in one or multiple cycles of rotation of the drum, per cleaning process.

In one embodiment of the invention, we have particles of 5 to 90 microns in the drum to filter the contamination, with drum rotating horizontally, and air pushing from bottom, coming in. In one embodiment of the invention, we have metal mesh/fiber, for more duration (less tears or breaks), and less clogging on the corners or edges, at e.g. 20 micron mesh sizes. In one embodiment of the invention, we have 40 RPH (revolutions per hour) to 2 RPM (revolutions per minute) for rotation of drum, e.g. for gathering toxic material/metals.

In one embodiment of the invention, we have a huge area/volume or area/diameter or area/size or cross-section/size or surface-area/size or area/weight or area/mass, for ratio or relative value, compared to the industry, so that we can capture the contaminants with a new fresh surface area in a large amount efficiently, reducing the cost and improving the quality.

In one embodiment of the invention, we have multiple beds in drums [5] and/or regular filters [11] in parallel for higher output, or in series, for various size particles, or reduce the percentage of escaped contaminants, or both. The multiple beds in drums can be back-to-back in series, e.g. going from large mesh to smaller mesh, in different stages for filtering process, for various size/type contaminants (see FIGS. 6-8).

Figure 6:
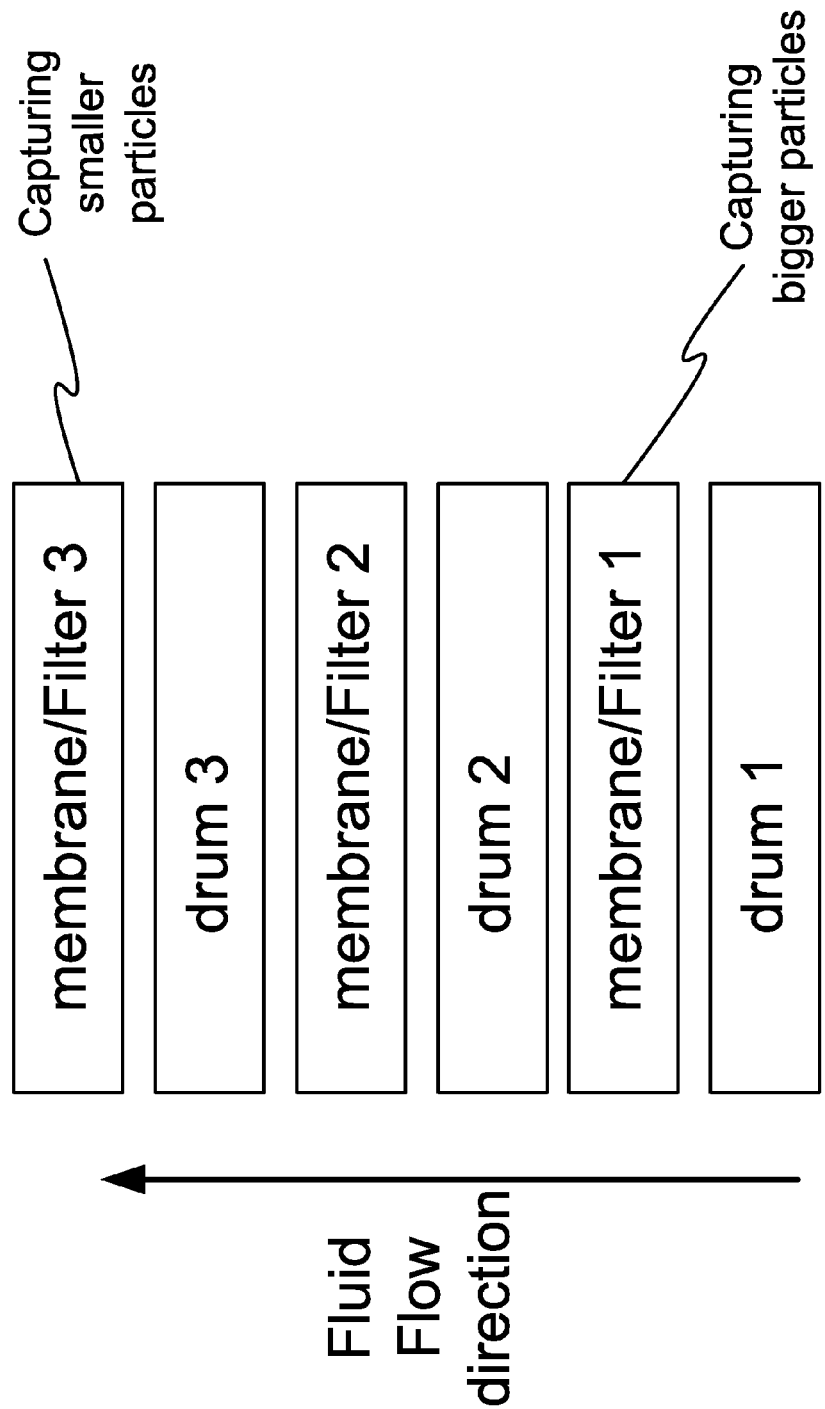
Figure 7:
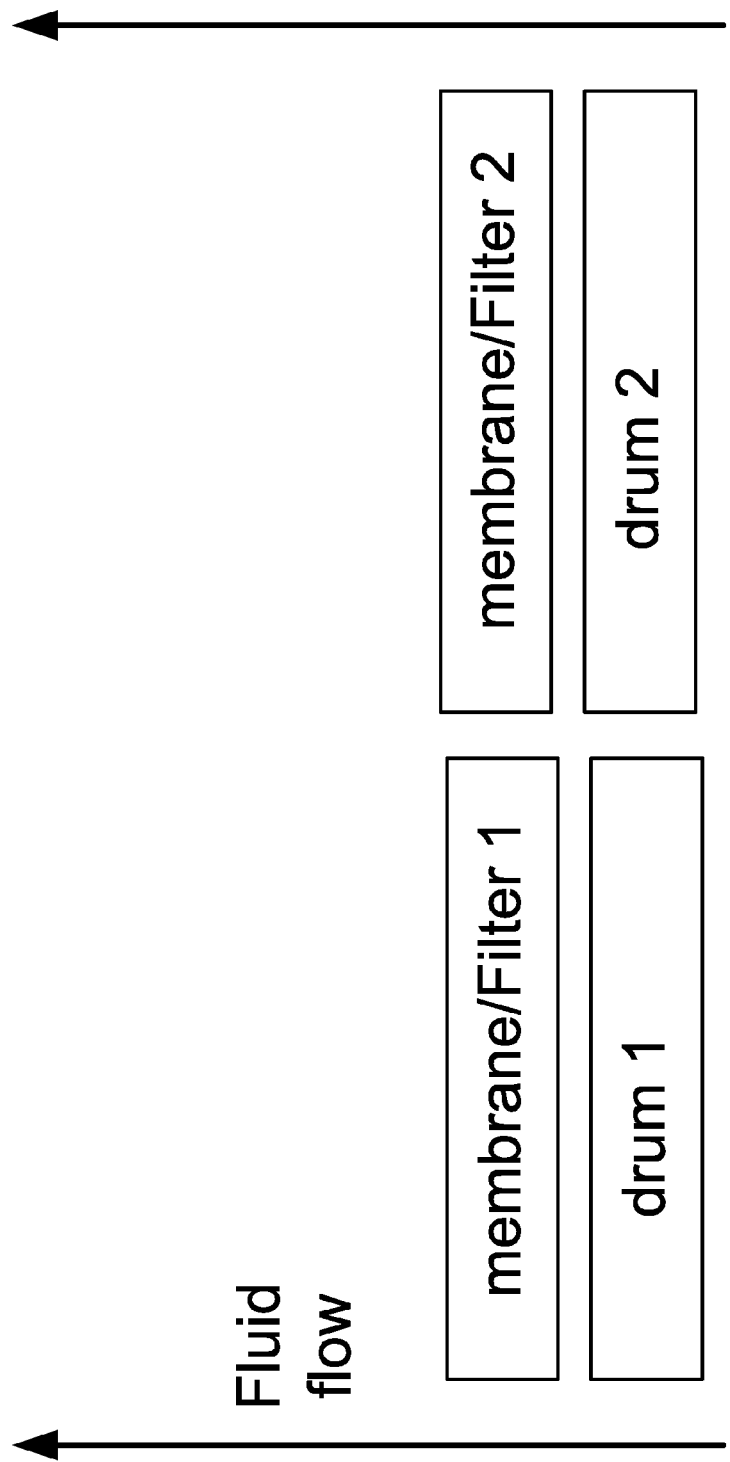

FIG. 1 is for one embodiment, as an example, for the whole apparatus. FIGS. 2-5 are for embodiments, as examples, for the cross section of the beds in drum. FIG. 6 is for one embodiment, as an example, for series configuration of beds in drums and filters or membranes. FIG. 7 is for one embodiment, as an example, for parallel configuration of drums and filters or membranes. FIG. 8 is for one embodiment, as an example, for series/parallel mixed configurations of drums and filters or membranes.

In one embodiment of the invention, we have changing bed in drum to clean up manually or by other means, or exchange it altogether with a new one, periodically.

Any variations of the above teaching are also intended to be covered by this patent application.

The invention claimed is:

1. An apparatus for filtering fluid, said apparatus comprising:
a cylindrical drum;
wherein said cylindrical drum contains iron oxide particles;
wherein said iron oxide particles are only sorbent used in said apparatus;
wherein said cylindrical drum rotates horizontally;
a motor;
wherein said motor rotates said cylindrical drum;
a pump;
wherein said pump pushes said fluid into said cylindrical drum from a bottom of said cylindrical drum, through an opening in a support structure of said cylindrical drum;
a secondary chamber;
wherein said fluid is pushed up, out of said cylindrical drum, into said secondary chamber;
a second filter;
wherein said fluid is moved through said secondary chamber into said second filter;
wherein said secondary chamber is located on top of said cylindrical drum;
wherein said second filter is located on top of said secondary chamber.

2. The apparatus for filtering fluid as recited in claim 1, wherein said iron oxide particles are nano-porous.

3. The apparatus for filtering fluid as recited in claim 1, wherein said iron oxide particles have size ranges from 5 to 90 microns.

4. The apparatus for filtering fluid as recited in claim 1, wherein said iron oxide particles have an average size of 21 microns.

5. The apparatus for filtering fluid as recited in claim 1, wherein said iron oxide particles have a size standard deviation of 2 microns.

6. The apparatus for filtering fluid as recited in claim 1, wherein said iron oxide particles have a size standard deviation of 10 microns.

7. The apparatus for filtering fluid as recited in claim 1, wherein said iron oxide particles have surface area ranges from 50 to 400 $m^2$/gram.

8. The apparatus for filtering fluid as recited in claim 1, wherein said iron oxide particles have surface area ranges from 230 to 260 $m^2$/gram.

9. The apparatus for filtering fluid as recited in claim 1, wherein said iron oxide particles have diameter pore size ranges from 10 to 90 angstroms.

10. The apparatus for filtering fluid as recited in claim 1, wherein said iron oxide particles have diameter pore size of 41 angstroms.

11. The apparatus for filtering fluid as recited in claim 1, wherein said iron oxide particles are unhydrated.

12. The apparatus for filtering fluid as recited in claim 1, wherein said iron oxide particles are hydrated.

13. The apparatus for filtering fluid as recited in claim 1, wherein said apparatus comprises a membrane.

14. The apparatus for filtering fluid as recited in claim 13, wherein said membrane has an aperture size ranging from 1 to 30 microns.

15. The apparatus for filtering fluid as recited in claim 13, wherein said membrane has an aperture size of 10 microns.

16. The apparatus for filtering fluid as recited in claim 13, wherein said membrane's fabric is polymeric or nylon.

17. The apparatus for filtering fluid as recited in claim 13, wherein said membrane's fabric is wire cloth or sintered metal.

18. The apparatus for filtering fluid as recited in claim 1, wherein said apparatus filters one or more of following contaminants: silver, arsenic, lead, sodium, magnesium, aluminum, potassium, calcium, titanium, manganese, cobalt, nickel, copper, zinc, or gold.

19. The apparatus for filtering fluid as recited in claim 1, wherein said fluid is one or more of following: water, air, gas, or liquid.

* * * * *